United States Patent [19]

Dietz

[11] Patent Number: 4,675,581
[45] Date of Patent: Jun. 23, 1987

[54] RASTER POSITIONING CIRCUIT FOR A DEFLECTION SYSTEM

[75] Inventor: Wolfgang F. W. Dietz, New Hope, Pa.

[73] Assignee: RCA Corporation, Princeton, N.J.

[21] Appl. No.: 833,030

[22] Filed: Feb. 26, 1986

[51] Int. Cl.$^4$ ............................................. H01J 29/54
[52] U.S. Cl. ...................................................... 315/398
[58] Field of Search ............... 315/398, 399, 408, 371, 315/389

[56] References Cited

U.S. PATENT DOCUMENTS

| | | |
|---|---|---|
| 3,510,723 | 5/1970 | Dumas . |
| 3,683,231 | 8/1972 | Jagatic ................................ 315/398 |
| 3,814,981 | 6/1974 | Rusk ................................... 315/398 |
| 3,980,927 | 9/1976 | Haferl ................................. 315/398 |
| 4,037,137 | 7/1977 | Dietz ................................... 315/398 |
| 4,423,358 | 12/1983 | den Hollander . |
| 4,472,662 | 9/1984 | Freed . |

FOREIGN PATENT DOCUMENTS 2104353  3/1983  United Kingdom .

OTHER PUBLICATIONS

A schematic diagram of a television chassis 100-20 published by Siemens-Electro, Germany; it is believed that the publication date is 1981.

Primary Examiner—Theodore M. Blum
Assistant Examiner—David Cain
Attorney, Agent, or Firm—Eugene M. Whitacre; Joseph J. Laks; Sammy S. Henig

[57] ABSTRACT

A television centering circuit includes a non-linear conduction network coupled in series with an inductance. The series arrangement is conductively coupled in parallel with a horizontal deflection winding. A control circuit for the non-linear conduction network utilizes negative feedback to sense and control the current in the inductance when the current is of a first polarity, thereby regulating the average value of the current in the inductance and in the deflection winding to provide raster centering.

15 Claims, 3 Drawing Figures

RASTER POSITIONING CIRCUIT FOR A DEFLECTION SYSTEM

The invention relates to a raster positioning circuit such as, for example, a centering circuit for a deflection system of a display.

Deflection systems utilized in television receivers or monitors frequently include circuitry which allows for the adjustment of, for example, the centering of the raster on the face of the kinescope tube. The need for this centering feature is increased as overscan of the kinescope tube is reduced, that is, as the raster width approaches the width of the kinescope tube face. Centering is usually accomplished by causing a direct current of selected polarity and amplitude to flow through the deflection windings.

In some prior art arrangements, the centering circuitry is placed in parallel with the deflection windings to produce an average, or DC current through the deflection winding during the trace interval. This centering circuitry includes a non-symmetrical conduction network including an adjustable resistor. An integrating inductor in coupled in series combination with the network for rectifying a portion of the current that flows in the integrating inductor and that provides centering. The nominal resistance of the adjustable resistor in this arrangement is, typically, relatively large as compared with the impedance of the deflection winding.

It may be desirable to control the rectified current in the integrating inductance in a more precise manner and within a narrow tolerance range to counteract effects of aging of components and temperature variations.

In accordance with an aspect of the invention, a deflection apparatus with raster positioning arrangement includes a source of a first signal at a frequency that is related to a deflection frequency. A deflection winding conducts a deflection current that causes the electron beam to form raster lines on the face of a display. A deflection rate voltage is generated in accordance with the first signal. An inductance responsive to the deflection rate voltage generates an alternating current in the inductance that is coupled to the deflection winding. A variation in the average value of the current in the inductance produces a corresponding variation in the average value of the deflection current and a corresponding variation in the positioning of the raster lines on the face of the display. A controllable conduction network responsive to a control signal and coupled in the current path of the current in the inductance rectifies the current in the inductance such that the average value of the current in the inductance is determined in accordance with the control signal. A signal that is indicative of the amplitude of the current in the inductance is generated. A control circuit, responsive to the signal that is indicative of the amplitude of the current in the inductance, generates the control signal such that the control circuit and the conduction network form a negative feedback control loop that regulates the average value of the current in the inductance.

In some television deflection systems, a B+ energizing voltage is coupled through a choke to a trace capacitor of a deflection circuit output stage for supplying the energy that is required by the output stage. In such arrangement, a direct current flows from a terminal of the trace capacitor via the deflection winding and through a deflection switch. Such direct current may, disadvantageously, cause a shift in the positioning of the raster to one side. The level of such direct current may be dependent on the losses of the system.

In carrying out another aspect of the invention, a centering circuit embodying the invention is coupled to the deflection winding to compensate for, or completely eliminate, such shift.

Figure 1:
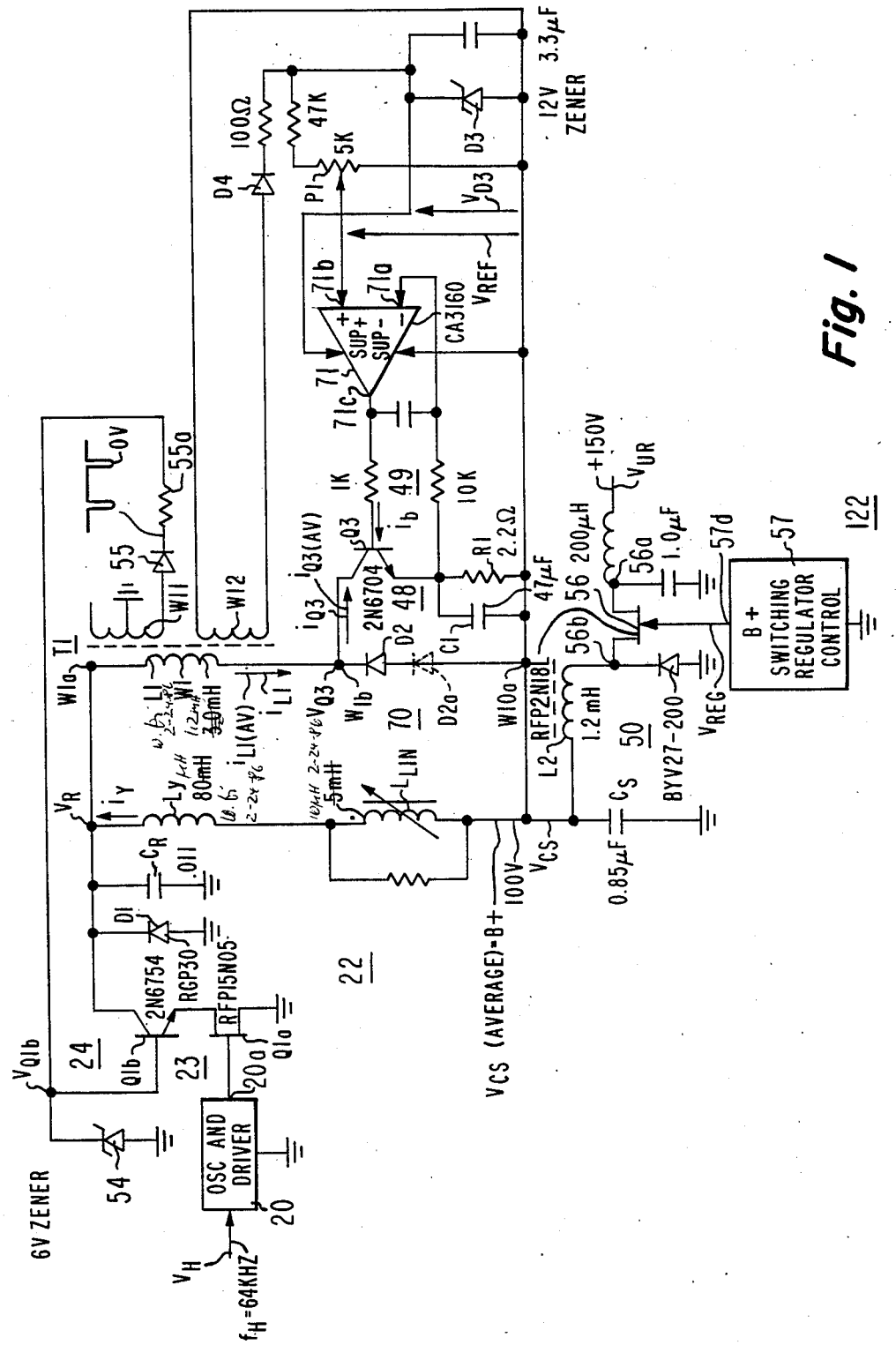
FIG. 1 illustrates a deflection system that includes a raster centering circuit, embodying the invention.

FIG. 1 illustrates a deflection system 122, embodying the invention, that includes an output stage 22 that generates a deflection current $i_Y$ in a deflection winding $L_Y$. Deflection winding $L_Y$ forms a series arrangement with a linearity inductor $L_{LIN}$. The series arrangement is coupled between terminals W1a and W10a. A voltage $V_{cs}$ that includes an average, or DC voltage B+ is developed at terminal W10a. Voltage $V_{cs}$ includes a parabolic voltage that is developed in a trace capacitor $C_s$ to provide S-correction of current $i_Y$. Terminal W1a is coupled to a deflection switch arrangement 24 that includes a damper diode D1 that is conductive during the first half of trace and a cascode switch arrangement 23 that is conductive in the second half of trace. During retrace switch arrangement 24 is nonconductive.

An oscillator and driver unit 20 receives a synchronizing signal $V_H$ at horizontal frequency $f_H$ from an incoming video signal. Unit 20 supplies an output signal 120a at the frequency $f_H$ for controlling the operation of output stage 22. Signal 120a is coupled to the gate of an FET switch Q1a of cascode switch arrangement 23 of output stage 22. Signal 120a causes switch Q1a to conduct from a time that occurs shortly prior to the center of the horizontal trace interval until switch Q1a becomes non-conductive, for initiating the retrace interval, at the end of the horizontal trace interval. A main current conducting electrode of FET switch Q1a is coupled to the emitter electrode of a transistor switch Q1b of cascode switch arrangement 23. The collector of transistor switch Q1b is coupled to end terminal W1a of primary winding W1 of transformer T1. A voltage $V_{Q1b}$, at the base electrode of transistor switch Q1b, is developed across a zener diode 54. During trace, voltage $V_{Q1b}$ that is positive is coupled from a series arrangement of a forward biased diode 55 and a resistor 55a coupled to a secondary winding W11 of transformer T1. During retrace voltage $V_{Q1b}$ is zero because diode 55 is non-conductive. At the beginning of retrace, the charge stored in the collector-base junction of transistor Q1b forms a collector-base current that causes zener diode 54 to conduct. Thus, zener diode 54 prevents voltage $V_{Q1b}$ from exceeding the breakdown voltage of zener diode 54.

One plate of a retrace capacitor CR that develops retrace voltage $V_R$ is coupled to terminal W1a of winding W1. The other plate of capacitor CR1 is coupled to ground. Damper diode D1, is coupled across the plates of retrace capacitor CR. Diode D1 clamps the voltage at terminal W1a to approximately the ground potential during the first half of the trace interval; whereas cascode switch arrangement 23 clamps the voltage at terminal W1a to approximately the ground potential during the second half of the trace interval. The switching operation of arrangement 23 at the horizontal rate generates both deflection current $i_Y$ in deflection winding $L_y$ and a current $i_{L1}$ in inductance L1. As described later on, current $i_{L1}$ provides raster centering.

S-shaping of the horizontal deflection current $i_Y$ is produced by trace capacitor $C_s$ having one plate that is coupled to terminal W10a and the other plate is coupled to ground. Energy losses are replenished by the DC voltage B+ part of voltage $V_{cs}$. The DC voltage B+ part of voltage $V_{cs}$ is coupled from a regulated supply 50. Voltage $V_{cs}$ includes a parabolic voltage part that provides S-shaping of current $i_y$.

Regulated supply 50 comprises a series pass transistor switch 56 operating with a duty cycle that is controlled by a B+ switching regulator control circuit 57. A current conducting terminal 56a of switch 56 is coupled to a DC unregulated voltage $V_{UR}$. The other current conducting terminal, a terminal 56b, is coupled via a choke L2 to terminal W10a for providing the DC current that replenishes the energy losses of deflection system 122. A flywheel diode 56a is coupled from terminal 56b to ground. Regulator circuit 57 produces at an output terminal 57d, a rectangular waveform signal $V_{REG}$ that is at, illustratively, the frequency $f_H$. The duty cycle of signal $V_{REG}$ controls the duty cycle of switch 56 so as to regulate the average or DC voltage B+ part of voltage $V_{cs}$ that energizes output stage 22.

A centering circuit 70, embodying an aspect of the invention, is coupled between terminals W1a and W10a. Centering circuit 70 includes a winding W1 that is inductive and that provides an integrating inductance L1 to circuit 70. Winding W1 that is coupled between terminal W1a and a terminal W1b and that provides inductance L1 is the primary winding of transformer T1.

A non-symmetrical conduction network 48 is coupled in series with winding W1 between terminal W1b and terminal W10a. Network 48 includes a diode D2, poled to conduct the negative portion of current $i_{L1}$ in inductance L1. Diode D2 is coupled between terminals W10a and W1b. A retrace voltage $V_R$ at terminal W1a develops in inductance L1 current $i_{L1}$ at the frequency $f_H$. The collector electrode of a transistor Q3 of network 48 that conducts a collector current $i_{Q3}$ is coupled to terminal W1b. The emitter electrode of transistor Q3 is coupled to an arrangement of a current sensing resistor R1 that is coupled in parallel with a capacitor C1. Each of resistor R1 and capacitor C1 has a corresponding terminal that is coupled to terminal W10a.

A control circuit 49, embodying another aspect of the invention, utilizes feedback for sensing the average value $i_{Q3(AV)}$ of positive current $i_{Q3}$ that is proportional to the DC voltage drop across resistor R1. As described in detail later on, control circuit 49 regulates the average value $I_{Q3(AV)}$ of positive current $i_{Q3}$ by controlling, in accordance with a voltage $V_{REF}$, a base electrode current $i_b$ of transistor Q3.

FIGS. 2a–2d and FIGS. 3a–3d illustrate waveforms that are useful for explaining the operation of centering circuit 70 of FIG. 1. Similar numbers and symbols in FIGS. 1, 2a–2d and 3a–3d indicate similar items or functions. FIGS. 2a–2d and the corresponding FIGS. 3a–3d illustrate similar types of waveforms for first and second examples, respectively.

Figure 2:
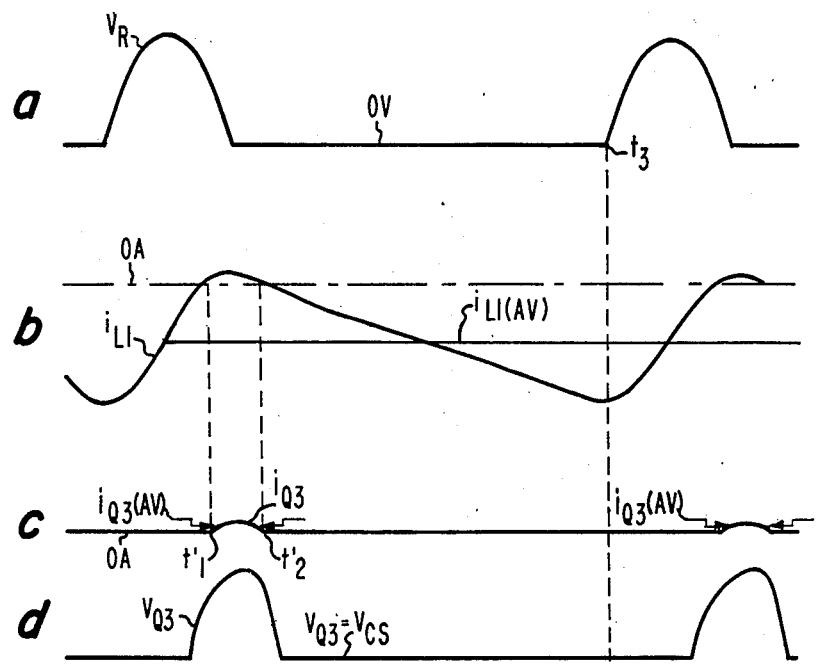
FIGS. 2a–2d illustrate a first example of waveforms useful in explaining the operation of the circuit of FIG. 1.

In, the first example, represented by FIGS. 2a–2d, the average value $I_{Q3(AV)}$ of current $i_{Q3}$ shown in FIG. 2c, is substantially smaller than that in the second example, represented by FIGS. 3a–3d. The positive portion of current $i_{L1}$ flows in transistor Q3 as collector current $i_{Q3}$. The average value $i_{Q3(AV)}$ of current $i_{Q3}$ is controlled by transistor Q3 and determines the average value of current $i_{L1}$, as described later on.

In the first example, shown in FIGS. 2a–2d, transistor Q3 of FIG. 1 conducts current $i_{Q3}$ in the interval $t_1'-t_2'$ of FIG. 2c. The positive portion of current $i_{L1}$ of FIG. 2b is equal to current $i_{Q3}$ of FIG. 2c in the interval $t_1'-t_2'$. In the second example, shown in FIGS. 3a–3d, transistor Q3 of FIG. 1 is in saturation and operates as a switch. The positive portion of current $i_{L1}$ of FIG. 3b is equal to current $i_{Q3}$ of FIG. 3c in the interval $t_1-t_2$.

Figure 3:
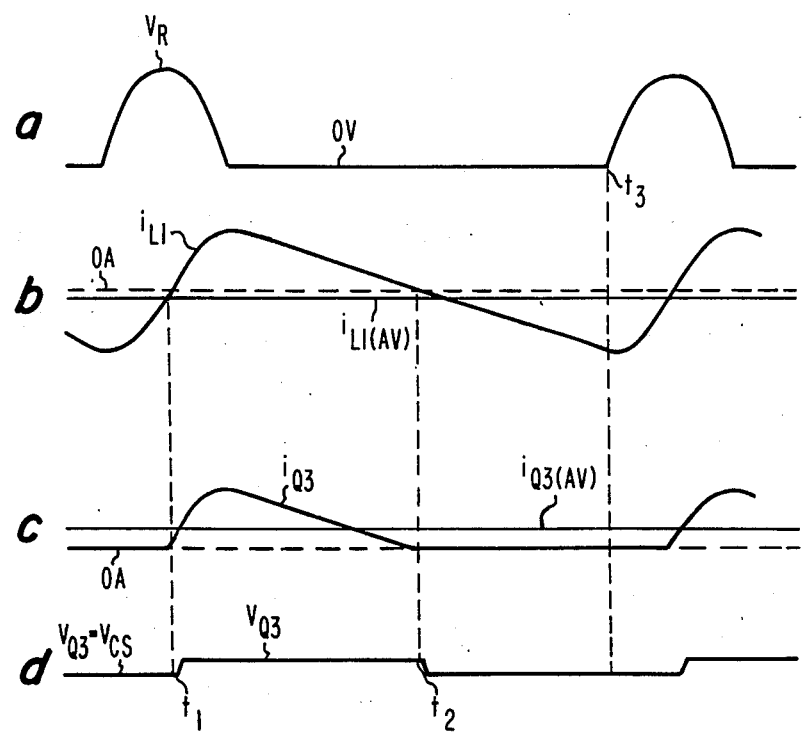
FIGS. 3a–3d illustrate a second example of waveforms useful in explaining the operation of the circuit of FIG. 1 for a centering current that is larger than in the first example.

Non-symmetrical conduction, or rectification, that is performed by network 48 of FIG. 1 causes the average value $i_{L1(AV)}$ of current $i_{L1}$ to become more negative in the first example of FIG. 2b than in the second example of FIG. 3b. The average value $i_{L1(AV)}$ of FIG. 1 is controlled by transistor Q3 of network 48 that regulates the average value $i_{Q3(AV)}$ of current $i_{Q3}$. The duration of the positive portion of the waveform of current $i_{L1}$ of, for example, FIG. 2b is controlled by transistor Q3 of FIG. 1 in such a way that current $i_{Q3}$ of, for example, FIG. 2c, that is equal in the interval $t_1'-t_2'$ to current $i_{L1}$ of FIG. 2b, provides the required average value $i_{Q3(AV)}$ of FIG. 2c. The remaining portion of the waveform of current $i_{L1}$ of FIG. 2b is negative. Thus, in each deflection cycle, transistor Q3 of FIG. 1 controls the ratio between the interval in which current $i_{L1}$ is positive and that in which it is negative.

In order to replenish energy losses when deflection system 122 of FIG. 1 produces a given peak-to-peak amplitude of deflection current $i_Y$, supply 50 has to supply a corresponding average DC current that flows in both inductor L1 and deflection winding $L_y$ and switch 23. As explained before, the average value of current $i_{L1}$ is controlled by transistor Q3. An increase in the magnitude of the average, or DC, current that flows in inductance L1 causes a corresponding decrease in the magnitude of the average value of current $i_Y$. Such increase in the magnitude of the average value of the current in inductance L1 replenishes losses that were incurred prior to such increase, by a corresponding portion of the DC current that flows in deflection winding $L_y$. Thus, transistor Q3, that controls the average value $i_{L1(AV)}$, controls the centering of the raster by also controlling the average value of deflection current $i_Y$.

The magnitude of the average value $i_{L1(AV)}$ in the first example of FIG. 2a, that is more negative, represents a larger positive DC current that flows from supply 50 via inductor L1 and into terminal W1a, than that flowing in the second example of FIG. 3b. Therefore, the magnitude of the average value of current $i_Y$ in the first example is smaller than that in the second example. It follows that deflection current $i_Y$ produces less offset of the raster in the first example than in the second example.

In accordance with an aspect of the invention, control circuit 49 regulates the average value of current $i_Y$ that determines the centering of the raster by precisely controlling the average value of current $i_{L1}$ in inductance L1. Control circuit 49 controls the average value of current $i_{L1}$ when current $i_{L1}$ is, illustratively, positive.

Control circuit 49 comprises a differential amplifier 71 having an inverting input terminal 71a that is coupled to resistor R1 for sensing the voltage across resistor R1. Because of the filtering action of capacitor C1, the voltage across resistor R1 is indicative of the average value $I_{Q3(AV)}$ of current $i_{Q3}$. A non-inverting input terminal 71b receives a voltage that is adjustable by adjusting a potentiometer P1, as described later on.

Control circuit 49, using negative feedback, controls the base current $i_b$ of transistor Q3 by controlling the voltage at a terminal 71c of amplifier 71. The output voltage at terminal 71c is controlled in the feedback loop in such a way that, in steady state, the voltages at input terminals 71a and 71b of amplifier 71 are substantially the same.

A secondary winding W12 of transformer T1 has an end terminal that is conductively coupled to terminal W10a. The other end terminal of winding W12 of transformer T1 is coupled through a diode D4 to the cathode of a zener diode D3. The anode of zener diode D3 is conductively coupled to terminal W10a. A voltage $V_{D3}$ across diode D3 provides the power required for operating differential amplifier 71 by coupling the anode of diode D3 to a terminal SUP+ and the cathode of diode D3 to a terminal SUP— of amplifier 71. Also, voltage $V_{D3}$ is coupled to potentiometer P1 for generating a reference voltage $V_{REF}$ that is coupled to noninverting input terminal 71b of amplifier 71. Thus, control circuit 49 has a floating common potential that is equal to voltage $V_{cs}$.

Voltage $V_{REF}$ between the wiper of potentiometer P1 and the terminal of potentiometer P1 that is at voltage $V_{cs}$. Voltage $V_{REF}$ is a constant DC voltage that is adjustable by adjusting the position of the wiper of potentiometer P1. The negative feedback loop of control circuit 49 causes the voltage across resistor R1, that determines the average value $i_{Q3(AV)}$ of current $i_{Q3}$, to be equal to voltage $V_{REF}$. Thus, adjustable voltage $V_{REF}$ also determines the average value $i_{L1(AV)}$ of current $i_{L1}$.

It should be understood that by coupling a predetermined time varying voltage to, for example, terminal 71b of amplifier 71, it is possible to correct other types of raster distortion. For example, a parabolic waveform at the vertical rate that is capacitively coupled to terminal 71b of amplifier 71 is capable of correcting a bow distortion. Similarly, a linear component voltage is capable of correcting tilt distortion.

A diode D2a, illustrated in broken lines in FIG. 1, may be added in series with diode D2 for obtaining a coarse adjustment of the average value of current $i_{L1}$ and that of current $i_Y$. When both diodes D2 and D2a are coupled in series with inductance L1, the increase in the forward resistance of the series coupled diodes D2 and D2a causes the average value $i_{L1(AV)}$ to become smaller in magnitude. A decrease in the magnitude of the average value $i_{L1(AV)}$ causes the average value of current $i_Y$ to become larger in magnitude, as described before. Thus, the magnitude of the average value of current $i_Y$ can be, for example, increased by adding diode D2a in series with diode D2.

What is claimed:

1. A deflection apparatus with a raster positioning arrangement, comprising:

a source of a first signal at a frequency that is related to a deflection frequency;

a deflection winding for conducting a deflection current that causes an electron beam to scan said raster on the face of a display;

switching means coupled to said deflection winding and responsive to said first signal for generating a deflection rate voltage;

an inductance responsive to said deflection rate voltage for generating an alternating current in said inductance that is coupled to said deflection winding, such that a variation in the average value of said current in said inductance produces a corresponding variation in the average value of said deflection current and a corresponding variation in the positioning of the raster on the face of the display;

a controllable conduction network responsive to a control signal and coupled in the current path of said current in said inductance for rectifying said current in said inductance such that the average value of said current in said inductance is determined in accordance with said control signal;

second means responsive to said current in said inductance for generating a signal that is indicative of the amplitude of said current in said inductance; and a control circuit, responsive to said signal that is indicative of the amplitude of said current in said inductance, for generating said control signal such that said control circuit and said conduction network form a negative feedback control loop that regulates the average value of said current in said inductance.

2. An apparatus according to claim 1 further comprising, a source of a DC current coupled to said deflection winding, said DC current having a first current portion that flows in said deflection winding at a level that is equal to the average value of said deflection current and having a second current portion that flows in said inductance.

3. An apparatus according to claim 1 further comprising, a trace capacitor coupled to said deflection winding, a source of a supply voltage and a choke, said choke having a first terminal that is coupled to said source of supply voltage and a second terminal that is coupled to said trace capacitor such that said deflection winding, said trace capacitor and said choke are included in first, second and third branches having a common junction terminal.

4. An apparatus according to claim 3 wherein said conduction network and said inductance are included in a fourth branch that is coupled to said common junction terminal.

5. An apparatus according to claim 1 wherein said controllable conduction network comprises a rectifier for conducting said current in said inductance when said current in said inductance is at a first polarity and third means for conducting said current in said inductance when said current in said inductance is at the opposite polarity.

6. An apparatus according to claim 5 wherein said rectifier comprises a first diode.

7. An apparatus according to claim 6 wherein said rectifier further comprises a second diode that is coupled in series with said first diode.

8. An apparatus according to claim 5 wherein said third means comprises a transistor and wherein said control signal is coupled to a control electrode of said transistor for controlling the average current in said transistor.

9. An apparatus according to claim 5 wherein said second means comprises a resistor, that is coupled in the current path of said current in said inductance when said current in said inductance is at the opposite polarity, for developing, in said resistor, a voltage that is indicative of the average value of said current in said inductance that is at the opposite polarity and a capacitor coupled to said resistor for filtering from said voltage in said resistor voltage variations that occur at said deflection rate.

10. An apparatus according to claim 9 wherein said capacitor is coupled in parallel with said resistor and wherein said signal that is indicative of the amplitude of said current in said inductance is generated across said resistor.

11. An apparatus according to claim 1 wherein said control circuit comprises an amplifier having a first input terminal for receiving a feedback signal that comprises said signal that is indicative of the amplitude of said current in said inductance, said amplifier having a second input terminal responsive to a second input signal and having an output terminal for generating said control signal, in accordance with the difference between the signals at said first and second input terminals of said amplifier, to regulate the average value of said current in said inductance in accordance with said second input signal.

12. An apparatus according to claim 1 wherein said conduction network comprises a transistor that conducts said current in said inductance when said current in said inductance is at a first polarity and wherein said control circuit comprises an amplifier that generates at an output terminal of said amplifier said control signal that is coupled to a control terminal of said transistor for controlling the average value of said current in said inductance that is at said first polarity.

13. An apparatus according to claim 1 wherein said conduction network comprises a transistor and wherein said second means comprises a resistor that is coupled in a main current conduction path of said transistor to form a current path that conducts said current in said inductance when said current in said inductance is at a first polarity.

14. A deflection apparatus with a raster positioning arrangement, comprising:

a source of a first signal at a frequency that is related to a deflection frequency;
a source of a DC voltage;
a deflection winding for conducting a deflection current that causes an electron beam to scan said raster;
a trace switch responsive to said first signal for generating a deflection rate voltage, said trace switch being coupled together with said deflection winding and said source of DC voltage to form a DC current path that conducts in said DC current path a first portion of a DC current that is equal to the average value of said deflection current;
an inductance responsive to said deflection rate voltage for generating an alternating current in said inductance that is coupled to said deflection winding, said inductance being coupled to said source of DC voltage for conducting a second portion of said DC current that is equal to the average value of said current in said inductance such that a variation in the level of said second portion of said DC current produces a corresponding variation in the level of said first portion of said DC current and a corresponding variation in the positioning of the raster on the face of said display;
a source of a control signal; and
a controllable conduction network responsive to said control signal and coupled in the current path of said current in said inductance for controllably rectifying said current in said inductance such that the level of said second portion of said DC current is determined in accordance with said control signal.

15. An apparatus according to claim 14 wherein said network includes an amplifier responsive to said control signal and coupled in the current path of said current in said inductance.

* * * * *